US012027902B2

(12) United States Patent
Kuriyagawa

(10) Patent No.: US 12,027,902 B2
(45) Date of Patent: Jul. 2, 2024

(54) CONTROL DEVICE, BATTERY UNIT, AND WORK MACHINE

(71) Applicant: HONDA MOTOR CO., LTD., Tokyo (JP)

(72) Inventor: Koji Kuriyagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 617 days.

(21) Appl. No.: 17/206,569

(22) Filed: Mar. 19, 2021

(65) Prior Publication Data

US 2021/0210960 A1 Jul. 8, 2021

Related U.S. Application Data

(63) Continuation of application No. PCT/JP2018/035694, filed on Sep. 26, 2018.

(51) Int. Cl.
*H02J 7/00* (2006.01)
*A01D 34/01* (2006.01)
(Continued)

(52) U.S. Cl.
CPC .............. *H02J 7/007* (2013.01); *A01D 34/01* (2013.01); *H02J 1/10* (2013.01); *H02J 7/0045* (2013.01); *H02J 7/0047* (2013.01); *H02J 7/34* (2013.01)

(58) Field of Classification Search
CPC ........ H02J 7/007; H02J 7/0045; H02J 7/0047; H02J 7/34; H02J 1/10; A01D 34/01
(Continued)

(56) References Cited

U.S. PATENT DOCUMENTS 4,358,727 A    11/1982  Campen
4,394,893 A *   7/1983  Kronich ................. F02N 15/10
                                                     477/204
(Continued)

FOREIGN PATENT DOCUMENTS

JP    H07-9044 U    2/1995
JP    2008-182822 A    8/2008
(Continued)

OTHER PUBLICATIONS

Extended European Search Report for European Patent Application No. 18935565.4 mailed Jul. 28, 2021.
(Continued)

*Primary Examiner* — Edward Tso
*Assistant Examiner* — Aaron Piggush
(74) *Attorney, Agent, or Firm* — Thomas| Horstemeyer, LLP

(57) ABSTRACT

A control device according to the invention, comprises a first electrode, electrically connected to a power unit, that receives a first electric power from the power unit as charging power of a battery, a second electrode, provided to be able to be electrically connected to a predetermined power source, that can receive a second electric power from the predetermined power source as the charging power of the battery, and a rectifier element, arranged in an electric path between the first electrode and both the battery and the second electrode, so as to allow passage of the first electric power from the power unit to the battery, and to regulate passage of the second electric power from the predetermined power source electrically connected to the second electrode to the power unit.

6 Claims, 11 Drawing Sheets

(51) Int. Cl.
*H02J 1/10* (2006.01)
*H02J 7/34* (2006.01)

(58) Field of Classification Search
USPC .............................. 320/104, 108, 128, 138
See application file for complete search history.

(56) References Cited

U.S. PATENT DOCUMENTS

| | | | |
|---|---|---|---|
| 5,864,223 | A | 1/1999 | Meyer |
| 9,127,658 | B2 | 9/2015 | Koenen et al. |
| 9,537,335 | B2 | 1/2017 | Furui et al. |
| 9,595,839 | B2 | 3/2017 | Furui et al. |
| 9,780,583 | B2 | 10/2017 | Furui et al. |
| 9,898,060 | B2 | 2/2018 | Smith |
| 10,032,123 | B2 | 7/2018 | Mejegard et al. |
| 10,380,511 | B2 | 8/2019 | Mejegard et al. |
| 10,396,573 | B2 | 8/2019 | Furui et al. |
| 10,685,299 | B2 | 6/2020 | Mejegard et al. |
| 10,749,360 | B2 | 8/2020 | Furui et al. |
| 2008/0174277 | A1* | 7/2008 | Ueno ............ H02J 1/106 320/138 |
| 2011/0266873 | A1 | 11/2011 | Tsuji |
| 2013/0113416 | A1* | 5/2013 | Ishibashi ........ H02J 7/007194 320/107 |
| 2014/0151079 | A1 | 6/2014 | Furui et al. |
| 2014/0159662 | A1 | 6/2014 | Furui et al. |
| 2014/0159919 | A1 | 6/2014 | Furui et al. |
| 2014/0159920 | A1 | 6/2014 | Furui et al. |
| 2015/0039269 | A1 | 2/2015 | Mejegard et al. |
| 2015/0058062 | A1 | 2/2015 | Mejegard et al. |
| 2015/0081359 | A1 | 3/2015 | Mejegard et al. |
| 2016/0077562 | A1 | 3/2016 | Smith |
| 2016/0204623 | A1 | 7/2016 | Haggerty et al. |
| 2018/0076639 | A1 | 3/2018 | Furui et al. |
| 2019/0334357 | A1 | 10/2019 | Furui et al. |
| 2020/0343744 | A1 | 10/2020 | Furui et al. |

FOREIGN PATENT DOCUMENTS

| | | |
|---|---|---|
| JP | 2015-126515 A | 7/2015 |
| WO | 2010/103603 A1 | 9/2010 |
| WO | 2020/065768 A1 | 4/2020 |

OTHER PUBLICATIONS

Chinese Office Action for Chinese Patent Application No. 201880098015.2 mailed Aug. 30, 2023.
International Search Report and Written Opinion for PCT/JP2018/035694 mailed Dec. 18, 2018.

\* cited by examiner

FIG. 4B1
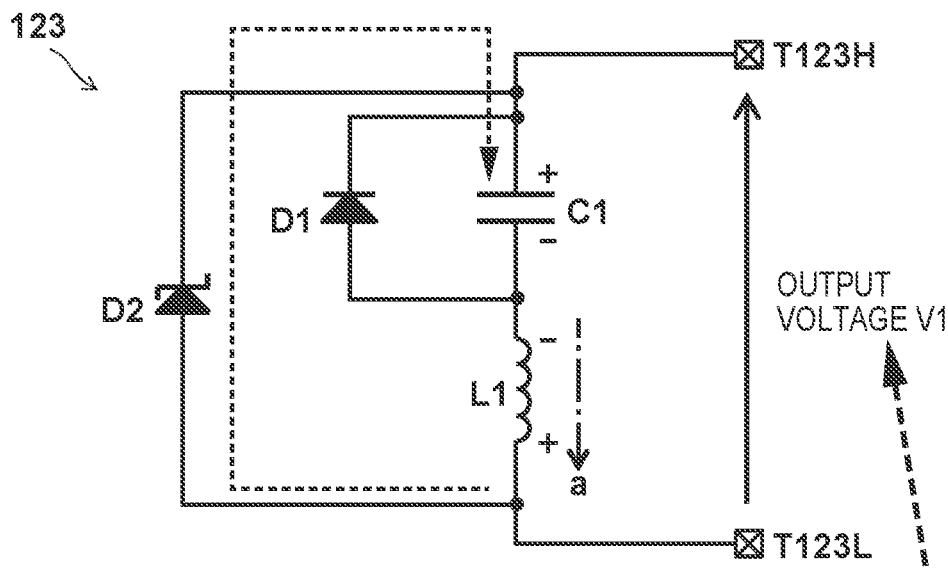
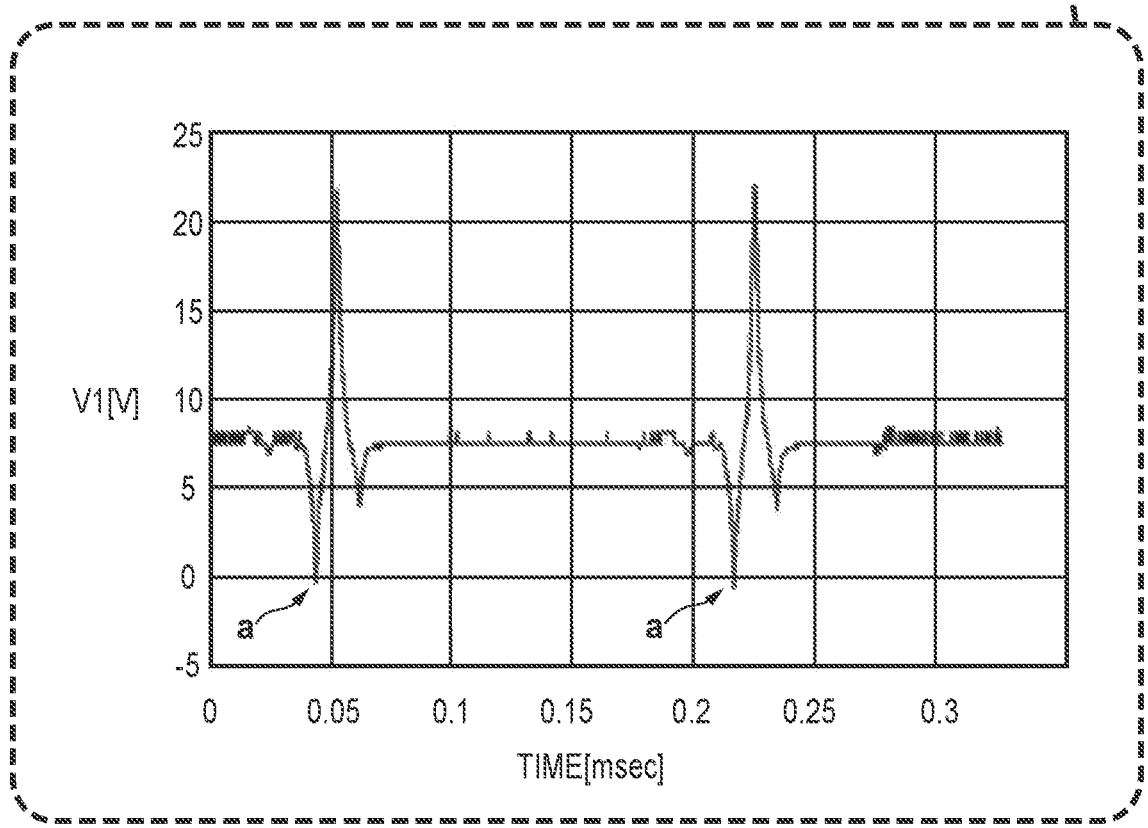

FIG. 4B2
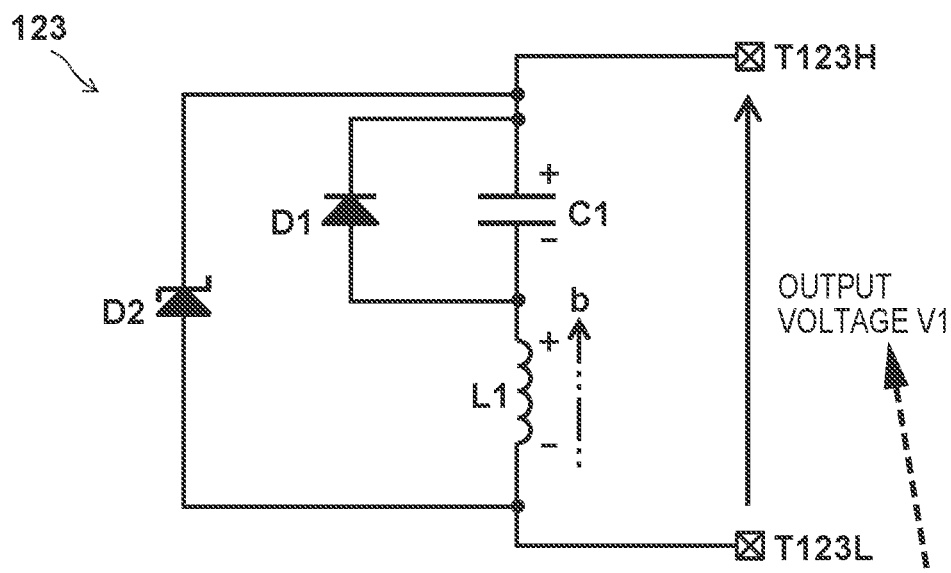
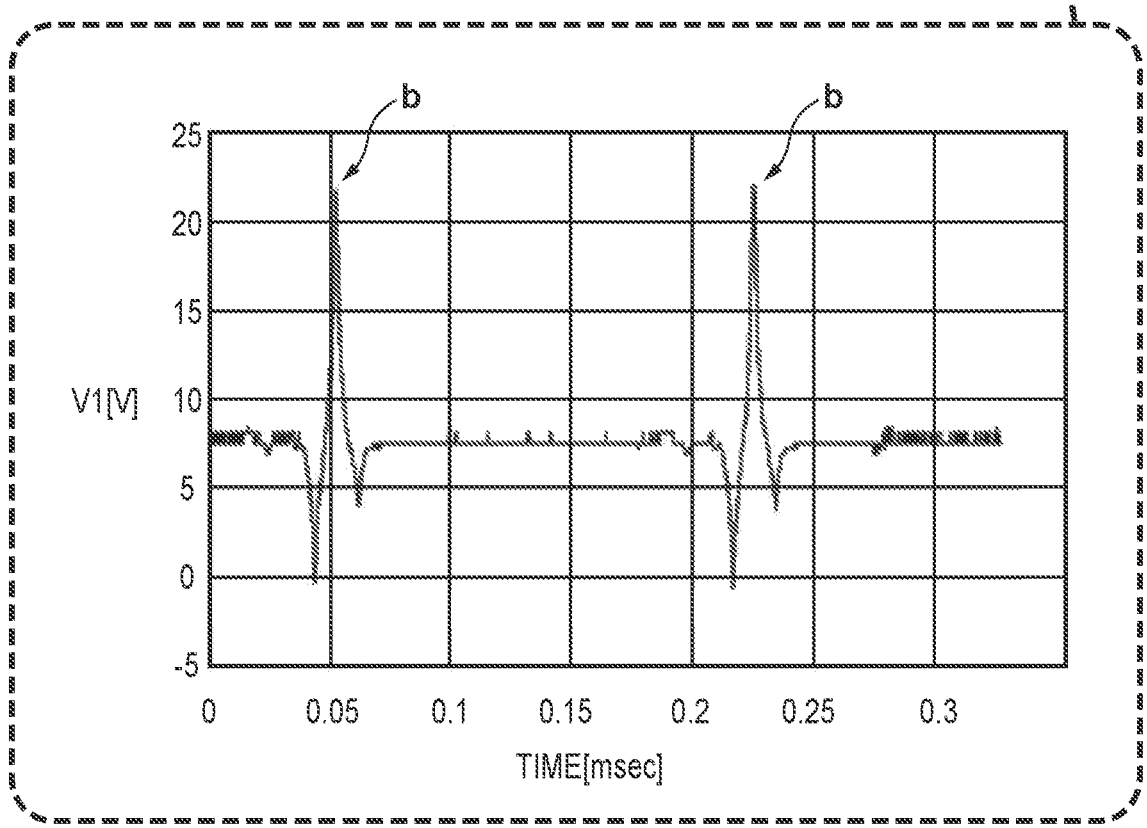

FIG. 4B3
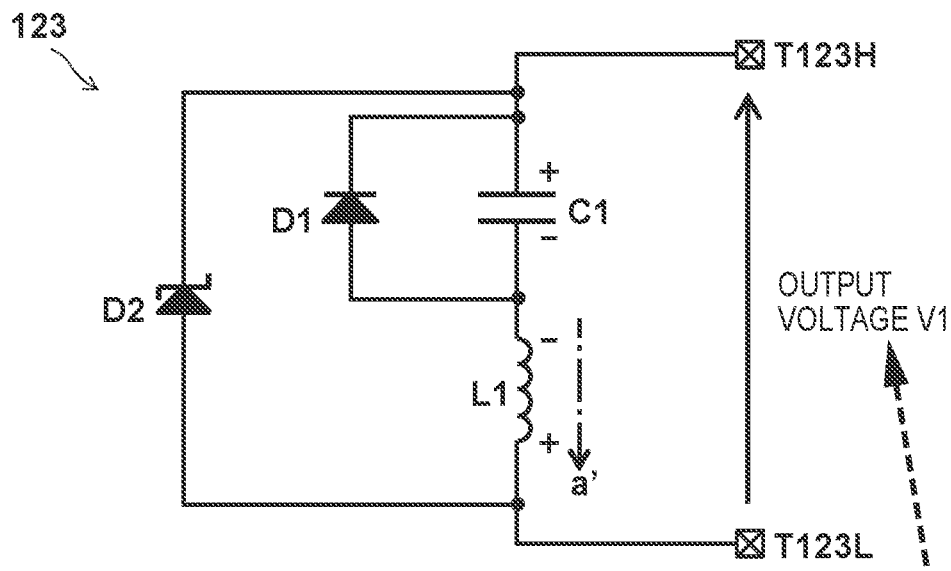
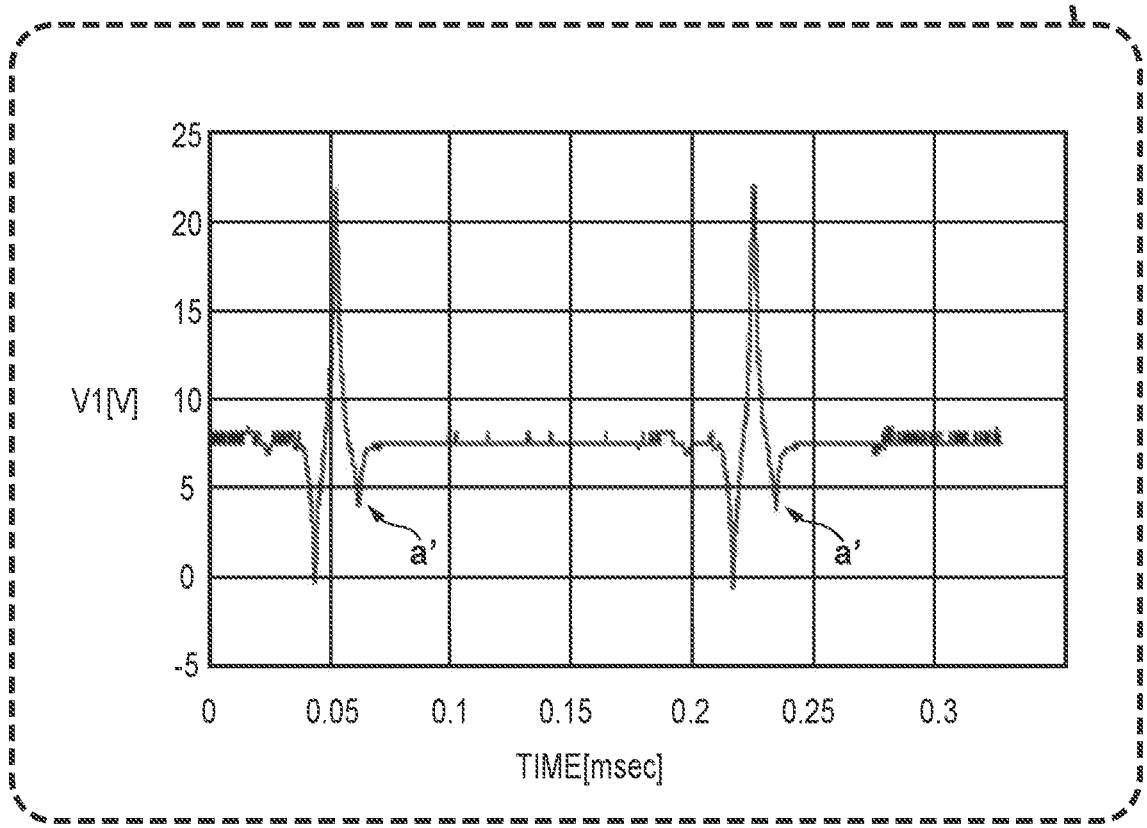

CONTROL DEVICE, BATTERY UNIT, AND WORK MACHINE

CROSS-REFERENCE TO RELATED APPLICATION(S)

This application is a continuation of International Patent Application No. PCT/JP2018/035694 filed on Sep. 26, 2018, the entire disclosures of which is incorporated herein by reference.

TECHNICAL FIELD

The present invention mainly relates to a control device for controlling the charging operation of a battery.

BACKGROUND ART

Some work machines include a battery (refer to PTL1). Generally, since the frequency of use of a work machine may be varied through the season, a user may not use the work machine over a relatively long period of time, which may cause battery down.

CITATION LIST

Patent Literature

PTL1: U.S. Pat. No. 9,127,658

SUMMARY OF INVENTION

Technical Problem

As an example of the configuration of a work machine capable of charging a battery, it is conceivable to enable the charging based on the power of a source of power such as an internal combustion engine. On the other hand, there is also a need to configure to be able to connect a predetermined power source, such as an external power supply, in case the source of power cannot be operated. Thus, a configuration is required for controlling the charging operation of a battery, so that charging based on power of a source of power, and charging using the power source can be appropriately achieved, respectively.

An object of the present invention is to provide a new configuration capable of appropriately controlling the charging operation of a battery.

Solution to Problem

One aspect of the present invention relates to a control device, and the control device is a control device for controlling a charging operation of a battery, and includes a first electrode that is electrically connected to a power unit, and that receives a first electric power from the power unit as charging power of the battery, a second electrode that is provided to be able to be electrically connected to a predetermined power source, and that can receive a second electric power from the predetermined power source as the charging power of the battery, and a rectifier element that is arranged in an electric path between both the battery and the second electrode and the first electrode, so as to allow passage of the first electric power from the power unit to the battery, and to regulate passage of the second electric power from the predetermined power source electrically connected to the second electrode to the power unit.

Advantageous Effects of Invention

According to the present invention, the charging operation of a battery can be appropriately controlled.

BRIEF DESCRIPTION OF DRAWINGS

FIG. 4B1 is a diagram for describing an operation mode of the charge coil unit.
FIG. 4B2 is a diagram for describing an operation mode of the charge coil unit.
FIG. 4B3 is a diagram for describing an operation mode of the charge coil unit.

DESCRIPTION OF EMBODIMENTS

Figure 1:
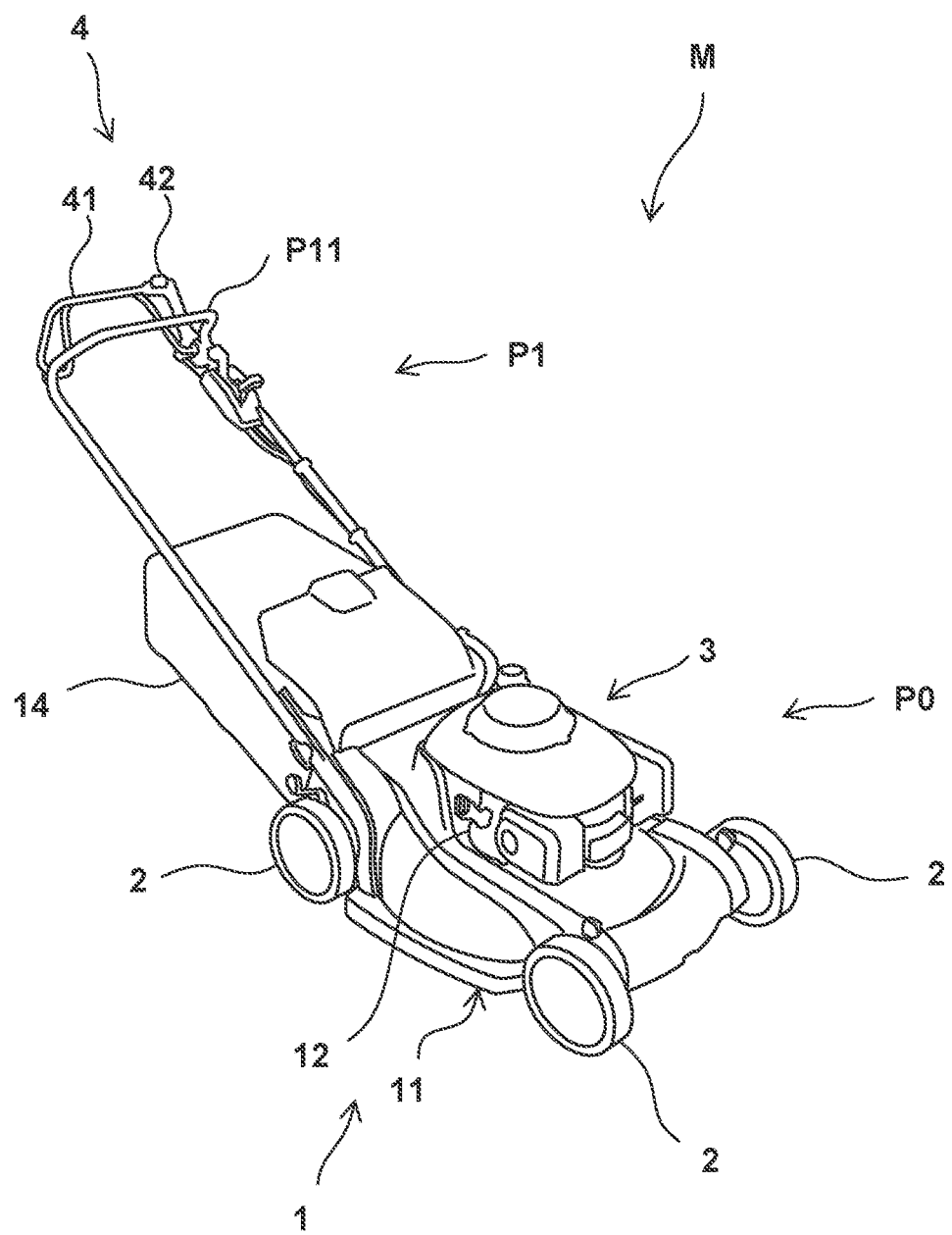
FIG. 1 is a perspective view for describing a configuration example of a work machine.

Hereinafter, embodiments of the present invention will be described with reference to the attached drawings. Note that each diagram is a schematic diagram showing the structure or configuration of an embodiment, and the size of each shown member does not necessarily reflect an actual size. Additionally, in each diagram, the same reference numerals are given to the same elements, and description of duplicate content in this specification is omitted.

Figure 2:
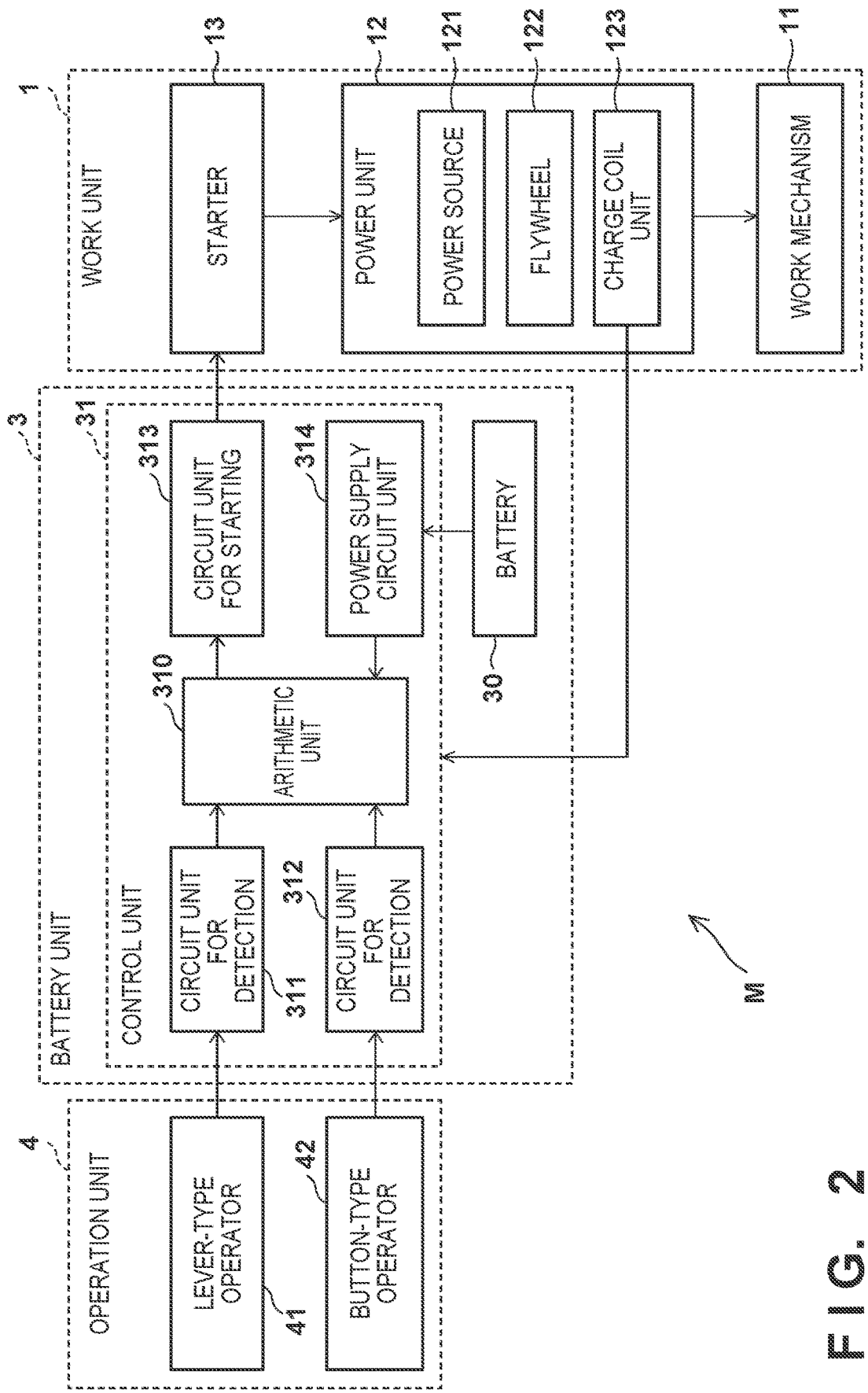
FIG. 2 is a block diagram for describing the configuration example of the work machine.

FIG. 1 is a perspective view of a work machine M according to an embodiment. FIG. 2 is a block diagram showing the main part of the configuration of the work machine M. The work machine M includes a work unit 1, a running unit 2, and a battery unit 3 in a main body unit P0. The work machine M further includes an operation unit 4 in an extension unit P1 extending behind and upward from the main body unit P0.

In the present embodiment, the work unit 1 includes a work mechanism 11, a power unit 12, a starter 13, and a grass bag 14. The work mechanism 11 is a mechanism for achieving a predetermined work. In the present embodiment, the work mechanism 11 is a disc-shaped blade rotatably arranged below the main body unit P0 (refer to FIG. 1), and accordingly, grass cutting can be performed as an example of the work (the work machine M may also be called a lawn mower.).

The power unit 12 includes a source of power 121, a flywheel 122, and a charge coil unit 123 (refer to FIG. 2). In the present embodiment, the source of power 121 is an internal combustion engine (engine), and generates power (rotation) for driving the work mechanism 11. The flywheel 122 is arranged to be able to rotate according to the power of the source of power 121, and stabilizes the rotation by the source of power 121. In the present embodiment, the flywheel 122 is coupled to a crankshaft of the internal combustion engine as the source of power 121. The flywheel 122 supports a magnet, which is not shown, and forms a flux change by rotating with this magnet. Although details will be described later, the charge coil unit 123 is configured to be able to output a voltage according to this flux change.

Further, a transmission such as an HST (Hydro-Static Transmission) may be additionally provided as a part of the power unit 12/for the power unit 12.

The starter 13 starts the power unit 12 in response to a signal from a control unit 31, which will be described later, included in the battery unit 3 (refer to FIG. 2). For example, the starter 13 is arranged such that a pinion gear is engaged with a ring gear of the flywheel 122, and makes it possible to start the power unit 12 by rotating the pinion gear. Note that, although details will be described later, the control unit 31 can detect that the power unit 12 is started, based on the output voltage from the above-described charge coil unit 123.

The grass bag 14 is a containing part for containing grass mown by the work mechanism 11, and is detachably arranged on a rear part of the main body unit P0 (refer to FIG. 1). With such a configuration, the work unit 1 can perform the work for a predetermined work area.

The running unit 2 includes a pair of front wheels and a pair of rear wheels that are each rotatably arranged on a lower part of the main body unit P0, thereby supporting the main body unit P0 (refer to FIG. 1). The running unit 2 can make the work machine M run by receiving the power from the power unit 12. An end of the extension unit P1 is configured into a bar shape as a grip portion (handle bar) P11 (refer to FIG. 1), and the user can perform the work while gripping this grip portion P11 and pressing the work machine M. The work machine M may also be called a walking-type work machine, a walking-type lawn mower, etc.

The operation unit 4 receives an input operation from the user for controlling the operation state of the work unit 1. The operation unit 4 may be provided in a position that is easy for the user to operate. In the present embodiment, the operation unit 4 includes a lever-type operator 41 and a button-type operator 42, and each of these is arranged in the extension unit P1, particularly the grip portion P11 or its periphery (refer to FIG. 1). The lever-type operator 41 is rotatably arranged in parallel to the above-described bar-shape grip portion P11 in the present embodiment, and the user inputs an operation by rotating this lever-type operator 41. The button-type operator 42 is an automatic return type push button switch arranged in one end of the grip portion P11 in the present embodiment, and the user inputs an operation by pressing this button-type operator 42. Note that the input operation by the user to the operation unit 4 is transmitted to the control unit 31, which will be described later, included in the battery unit 3 as an electric signal via a cable, a wire, or the like.

In the present embodiment, it is assumed that the work unit 1 will be in the operation state when the user operates the button-type operator 42 while operating the lever-type operator 41. That is, even if the user presses the button-type operator 42 without rotating the lever-type operator 41, the work unit 1 will not be in the operation state. The above-described operation mode of operating the button-type operator 42 while operating the lever-type operator 41 is also called a two-step operation or the like, and is advantageous for securing the safety at the time of operating the work unit 1.

After the work unit 1 is in the operation state, the user can perform the work with the work unit 1 in the operation state, by making the work machine M run while maintaining the lever-type operator 41 in an operated state (a state in which the lever-type operator 41 is rotated). Additionally, the user can turn the work unit 1 into a stop state at a desired timing by canceling the operation of the lever-type operator 41 (for example, removing the hands from the lever-type operator 41). In the present embodiment, it is assumed that, in the stop state of the work unit 1, the power unit 12 will be in a stop state and the work mechanism 11 will also be in a stop state.

As another embodiment, the work mechanism 11 and the power unit 12 can be mechanically coupled by a clutch, and the coupling/decoupling of this clutch may be controllable by the lever-type operator 41. For example, the clutch will be in a coupled state by operating the lever-type operator 41, and the clutch will be in a disconnected state by canceling the operation. In this case, in response to cancellation of the above-described operation of the lever-type operator 41, without stopping the power unit 12, the transmission of its power to the work mechanism 11 can be cut off.

The operation unit 4 may further include other operators in the extension unit P1 or the main body unit P0. An operator for adjusting the height of the disc-shaped blade, which is the work mechanism 11, an operator for changing the output level of the power unit 12, an operator for braking the running unit 2, and the like can be listed as the examples.

The battery unit 3 includes a battery 30 and the control unit 31, and these are formed into a unit in the present embodiment. Since the battery 30 and the control unit 31 are formed into the unit, the handling of the battery unit 3 (for example, handling in a case where the battery unit 3 is assembled to the main body unit P0, and the like) becomes easy. Although the single battery 30 is shown here for simplification of the description, the number of the battery 30 may be two or more. For example, the battery unit 3 may be configured to contain both a plurality of batteries 30 connected in series 30 and the control unit 31 in a predetermined housing.

The control unit 31 is an electrical component that receives electric power from the battery 30, and performs control of each element of the work machine M, for example, the drive control of the above-described work unit 1 and the like, based on an input operation by the user to the operation unit 4. The control unit 31 may also be called a control device, a control board, or the like, and may include, for example, a wiring unit for achieving electric connection between elements, in addition to one or more mounting substrates on which electronic components are mounted. As examples of the electronic components, semiconductor devices, such as an ASIC (application specific semiconductor integrated circuit), a PLD (programmable logic device), and a so-called discrete component, can be listed. As examples of the wiring unit, a wire harness, an FPC (flexible printed circuit), a CoF (chip on film), and the like can be listed.

In the present embodiment, the control unit 31 includes an arithmetic unit (signal-processing circuit unit) 310, circuit units 311 and 312 for detection, a circuit unit 313 for starting, and a power supply circuit unit 314 (refer to FIG. 2). Note that, in the present specification, a circuit unit refers to an element in which one or more passive elements or active elements are electrically connected so that a predetermined function can be achieved, and thus, each of the circuit units may be separately provided in several portions, or may be provided in the vicinity of other circuit unit.

The arithmetic unit 310 is an MCU (Micro Controller Unit) or MPU (Micro Processing Unit) that performs signal processing for performing system control of the entire work machine M based on the electric power of the battery 30. A predetermined battery management IC (Integrated Circuit), such as RAJ240100 (Renesas Electronics Corporation), may be used for the arithmetic unit 310.

One or more input circuit ICs capable of detecting an operation that is input to the lever-type operator 41 may be used for the circuit unit 311 for detection. The circuit unit 311 for detection supplies, to the arithmetic unit 310, an electric signal indicating that an operation is input to the lever-type operator 41.

One or more input circuit ICs capable of detecting an operation that is input to the button-type operator 42 may be used for the circuit unit 312 for detection. The circuit unit 312 for detection supplies, to the arithmetic unit 310, an electric signal indicating that an operation is input to the button-type operator 42.

In response to receiving the signals from both of the circuit units 311 and 312 for detection, the arithmetic unit 310 outputs a predetermined start signal to the circuit unit 313 for starting, and starts the power unit 12 by using the starter 13. The power of the power unit 12 is transmitted to the work mechanism 11, and the work mechanism 11 will be in a drive state, that is, the work unit 1 will be in the operation state.

The power supply circuit unit 314 generates one or more power supply voltages based on the voltage of the battery 30, and supplies it/them to the arithmetic unit 310. The power supply circuit unit 314 may be provided to be able to divide the voltage of the battery 30 with a predetermined voltage divider circuit, or as an alternative to this, a power supply IC including a DC-DC converter and the like may be used as the power supply circuit unit 314. Although the expression voltage (power supply voltage) is used here for simplification of the description, the expression electric power may be used in consideration of a current component, such as a drive current. Note that the arithmetic unit 310 includes a built-in regulator, and can also generate yet another power supply voltage based on the power supply voltage received from the power supply circuit unit 314.

It is assumed that a rechargeable secondary battery, such as a lithium ion battery and a nickel hydride battery, is used for the battery 30. Here, the charge coil unit 123 and the control unit 31 are electrically connected to each other, and the control unit 31 can charge the battery 30 based on the output voltage from the charge coil unit 123. This will be described below with reference to FIG. 3 to FIG. 4B3.

Figure 3:
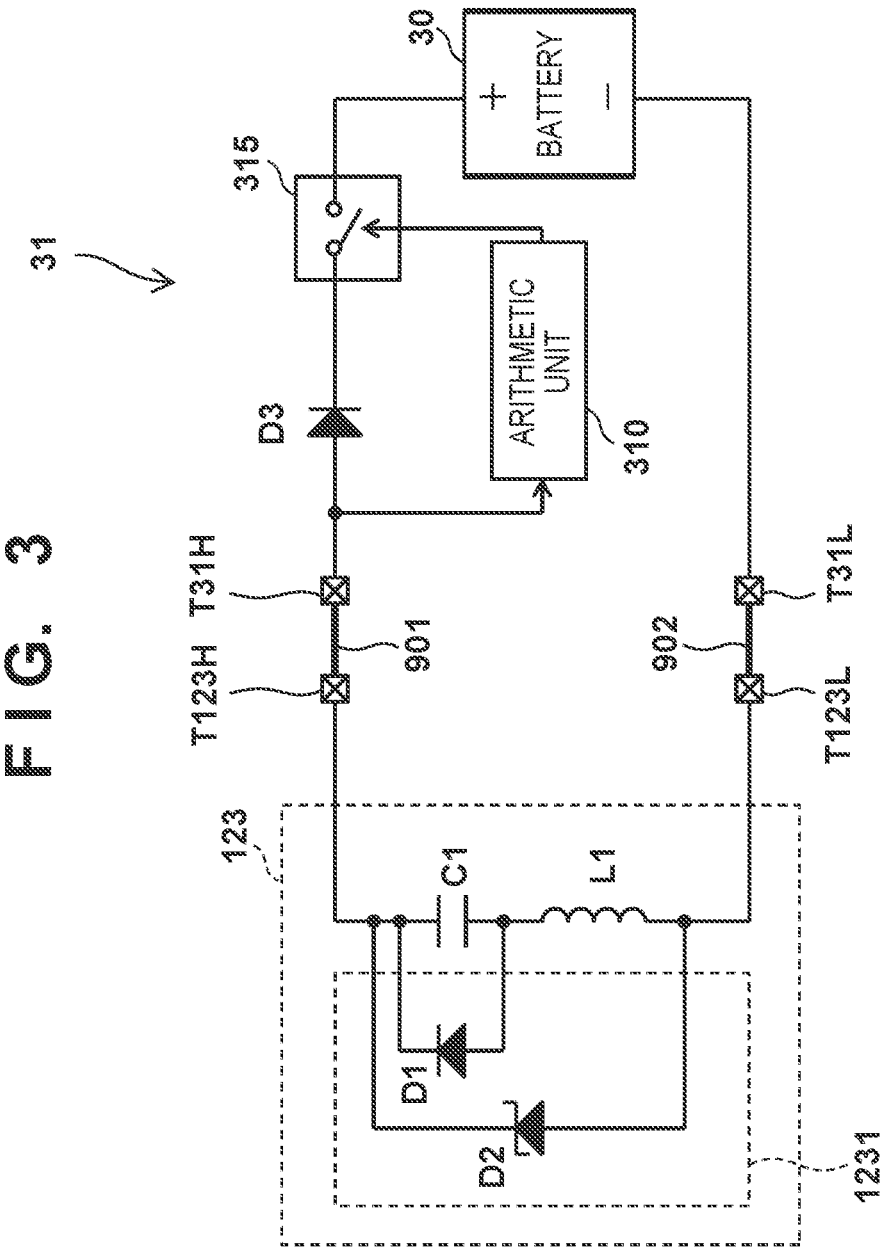
FIG. 3 is a diagram for describing a configuration example of a charge coil unit.

FIG. 3 is a diagram for describing a configuration example of the charge coil unit 123. The charge coil unit 123 is electrically connected to the control unit 31 via predetermined wiring units 901 and 902.

The charge coil unit 123 includes an inductor L1, a capacitor C1, and a circuit unit 1231. The inductor L1 and the capacitor C1 are mutually connected in series. In the present embodiment, the inductor L1 is arranged on a low voltage side (ground side), and the capacitor C1 is arranged on a high voltage side (power supply voltage side). The circuit unit 1231 is provided to be able to charge the capacitor C1 by an induced current generated in the inductor L1. In the present embodiment, the circuit unit 1231 includes rectifier elements D1 and D2, the rectifier element D1 is connected in parallel to the capacitor C1, and the rectifier element D2 is connected in parallel to the above-described inductor L1 and capacitor C1 that are connected in series. The rectifier element D2 is configured such that its breakdown voltage becomes lower than the breakdown voltage of the rectifier element D1, and in the present embodiment, it is assumed that a Zener diode is used as the rectifier element D2.

Note that the circuit unit 1231 may further include a resistance element having a relatively high resistance value (a pull-up resistance element or a pull-down resistance element) for the purpose of giving an initial potential to a node between the inductor L and the capacitor C1, or the like. Additionally, the inductance of the inductor L and the capacitance of the capacitor C1 may be determined based on the design values of respective elements, such as the maximum output value of the source of power 121, and battery capacity of the battery 30.

The charge coil unit 123 further includes a connection terminal T123H on the high voltage side and a connection terminal T123L on the low voltage as external electrodes for achieving electric connection with the control unit 31. The control unit 31 further includes a connection terminal T31H on the high voltage side and a connection terminal T31L on the low voltage side as external electrodes for achieving electric connection with the charge coil unit 123. The connection terminal T123H and the connection terminal T31H are connected by the wiring unit 901, and the connection terminal T123L and the connection terminal T31L are connected by the wiring unit 902, and accordingly, the charge coil unit 123 is electrically connected to the control unit 31.

The control unit 31 further includes a switching unit 315 and a rectifier element D3. The switching unit 315 is, for example, an electronic component including a high breakdown voltage transistor, and can switch between start and end of the charging operation at the time of charging the battery 30. For example, when the switching unit 315 is turned into a conductive state, charging of the battery 30 is performed, and when the switching unit 315 is turned into a non-conductive state, charging of the battery 30 is stopped. The rectifier element D3 is an electronic component for preventing the reverse current flow from the battery 30 to the charge coil unit 123 at the time of performing charging of the battery 30, and can protect the charge coil unit 123. The switching unit 315 and the rectifier element D3 may be mounted on a predetermined mounting substrate with the arithmetic unit 310.

As shown in FIG. 3, the switching unit 315 and the rectifier element D3 are connected in series between the connection terminal T31H and the positive terminal (+) of the battery 30. In the present embodiment, the switching unit 315 is arranged on a positive terminal side of the battery 30, and the rectifier element D3 is arranged on a connection terminal T31H side. In the present embodiment, the arithmetic unit 310 is arranged to be able to switch between the conductive state and the non-conductive state of the switching unit 315 based on the output voltage (the voltage value or signal level of the connection terminal T31H) from the charge coil unit 123. Additionally, the negative terminal (−) of the battery 30 is connected to the connection terminal T31L.

Figure 4A:
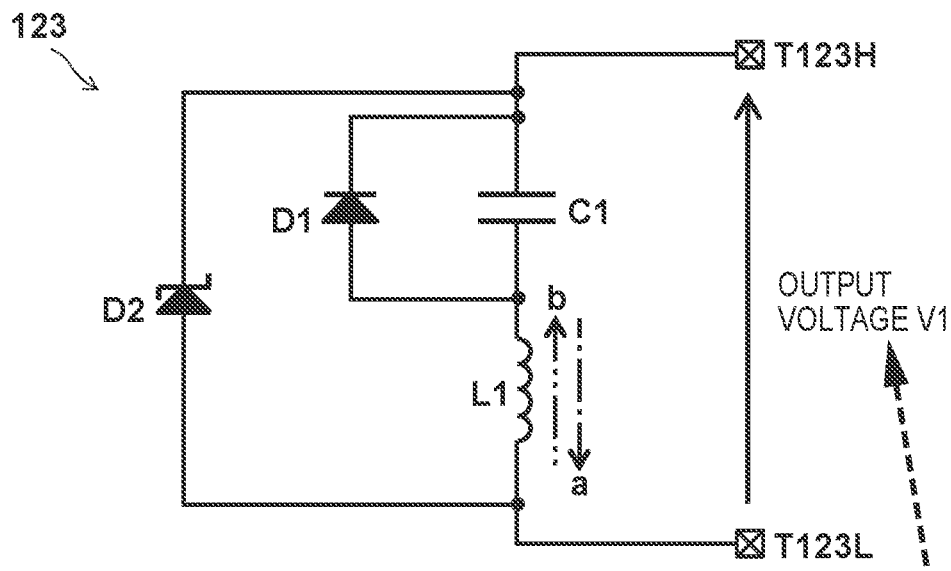
FIG. 4A is a diagram for describing an operation mode of the charge coil unit.
Figure 4A:
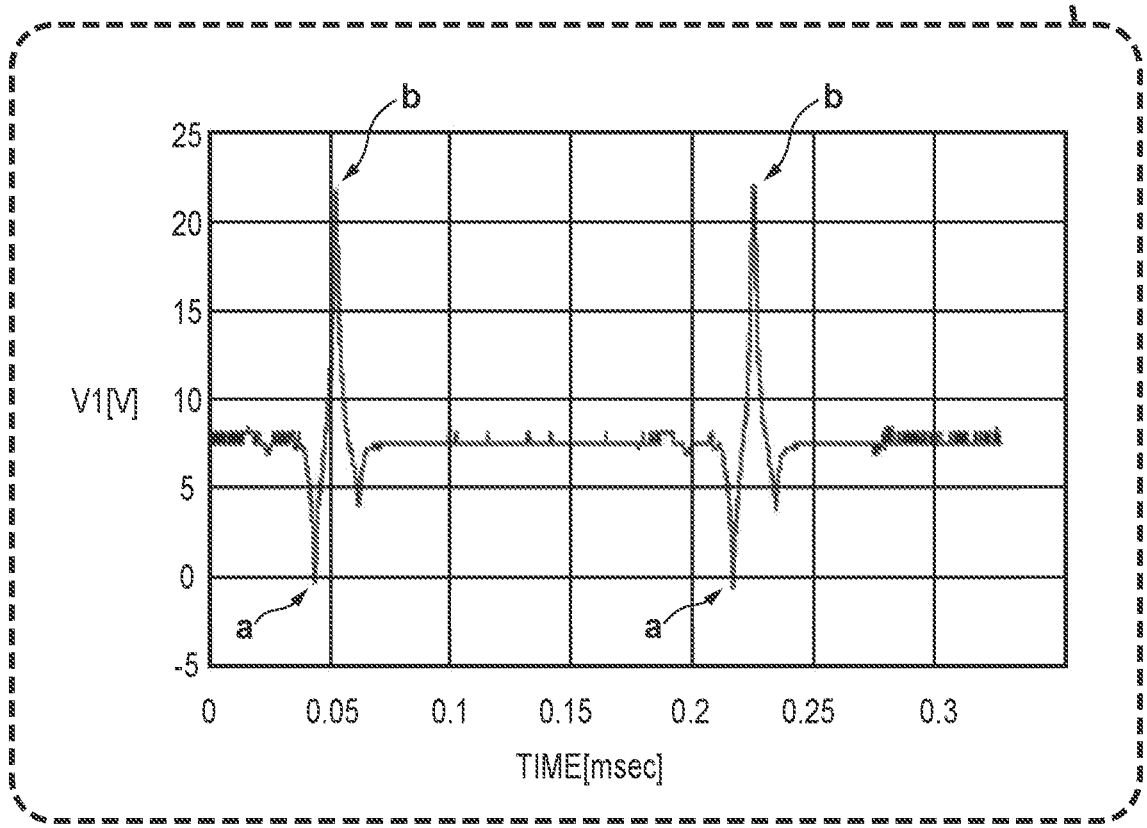

FIG. 4A is a diagram for describing an operation mode of the charge coil unit 123. As previously described, the magnet is supported by the flywheel 122, and the flux change is generated by the magnet in association with the power of the source of power 121 (the rotation of the flywheel 122). In the present embodiment, it is assumed that (the strength of) a magnetic field changes in a sinusoidal manner with the rotation of the flywheel 122, and one period of the change in the magnetic field corresponds to one rotation of the flywheel 122.

The charge coil unit 123 is arranged in the position where the above-described flux change can be detected, and by this flux change, an induced voltage is generated in the inductor L1 in the direction indicated by "a" or "b" in the diagram. Although details will be described later, for example, when the induced voltage in the above-described a direction is generated, the current (induced current) generated by this induced voltage is led to the capacitor C1 by the rectifier element D2, and charges the capacitor C1.

The waveform of an output voltage V1 (open circuit voltage) of the charge coil unit 123 is also shown in the lower part of FIG. 4A. In the present embodiment, the charging voltage (here, approximately 8 [V]) of the capacitor C1 biases the output voltage V1, and the output voltage V1 shows a pulsed waveform according to the generation of the above-described induced voltage while using approximately 8 [V] as a reference point. FIG. 4B1 shows a mode in a case where the induced voltage in the above-described a direction is generated as in FIG. 4A. FIG. 4B2 shows a mode in a case where the induced voltage in the above-described b direction is generated as in FIG. 4A. FIG. 4B3 shows a mode in a case where the induced voltage in the above-described a direction is generated again (the second time) as in FIG. 4A (indicated by "a'", so as to distinguish from the induced voltage in the above-described a direction in the first time.).

As shown in FIG. 4B1, when the induced voltage in the above-described a direction is generated, the charging current for the capacitor C1 is generated, and the capacitor C1 is charged. In the figure, this charging current is indicated by a broken line arrow. Additionally, in the figure, the generation direction (polarity) of the induced voltage of the inductor L1 is indicated by "+" and "−". When enough time has passed since the rotation of the flywheel 122 is started, in the present embodiment, the charging voltage of the capacitor C1 associated with the generation of the induced voltage in the above-described a direction is approximately 8 [V]. In the figure, similar to the induced voltage of the inductor L1, the generation direction (polarity) of the charging voltage of the capacitor C1 is indicated by "+" and "−".

Thereafter, as shown in FIG. 4B2, when the induced voltage is generated in the above-described b direction, the generation direction of the induced voltage of the inductor L1 and the generation direction of the charging voltage of the capacitor C1 become mutually the same as indicated by "+" and "−" in the figure. The output voltage V1 is the sum of "the induced voltage of the inductor L1" and "the charging voltage of the capacitor C1", and accordingly, the output voltage V1 is increased to approximately 22 [V].

Further, thereafter, as shown in FIG. 4B3, the induced voltage in the above-described a' direction is generated. The induced voltage in the above-described a' direction is approximately 3 [V], and is lower than the induced voltage (approximately 8 [V]) generated earlier. Therefore, a current in the forward direction does not substantially flow into the diode D2, that is, the charging current to the capacitor C1 is not substantially generated. When the induced voltage in the above-described a' direction is generated, as in the case where the induced voltage in the above-described b direction is generated, the output voltage V1 is the sum of "the induced voltage of the inductor L1" and "the charging voltage of the capacitor C1", and the output voltage V1 returns to approximately 8 [V] after being decreased to approximately 5 [V].

As previously described, the Zener diode is used for the rectifier element D2, and the charge coil unit 123 may be configured such that the output voltage V1 does not exceed the breakdown voltage of the rectifier element D2. The breakdown voltage of the rectifier element D2 may be about 150 [V], or may be about 100 [V] or 50 [V]. Accordingly, it is ensured that no overvoltage is applied to the output target of the charge coil unit 123, and in the present embodiment, the battery 30 and the control unit 31 can be protected.

With such a circuit configuration, the charge coil unit 123 outputs a signal based on the power of the source of power 121 to the control unit 31 as the output voltage V1. In the control unit 31, the arithmetic unit 310 controls the switching unit 315 based on the output voltage V1. For example, when the switching unit 315 is in the conductive state, the control unit 31 can charge the battery 30 by using the output voltage V1. At this time, in the present circuit configuration, since the output voltage V1 is biased by the charging voltage (approximately 8 [V]) of the capacitor C1, it is also advantageous for faster charging of the battery 30. In addition, the control unit 31 can also additionally perform detection of the number of rotations of the source of power 121, and other control using the detection result.

Figure 5:
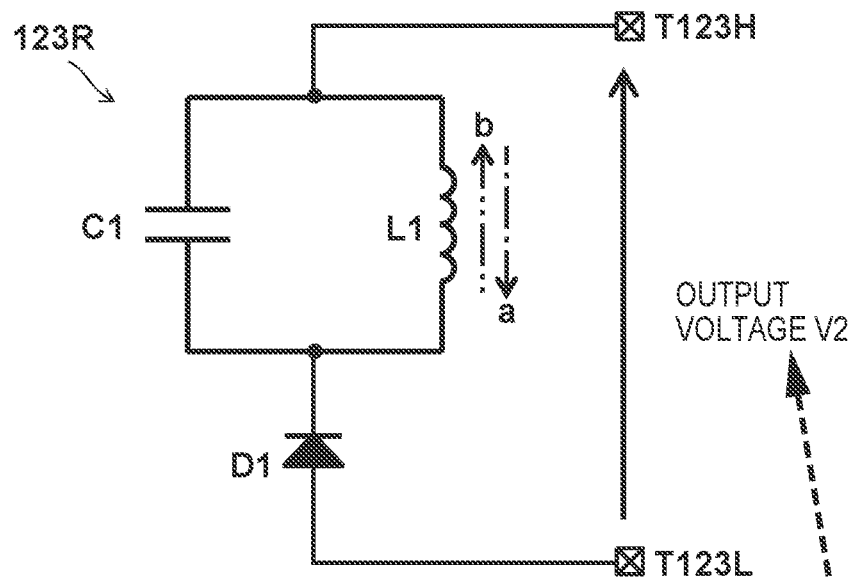
FIG. 5 is a diagram for describing an operation mode of the charge coil unit (comparison example).
Figure 5:
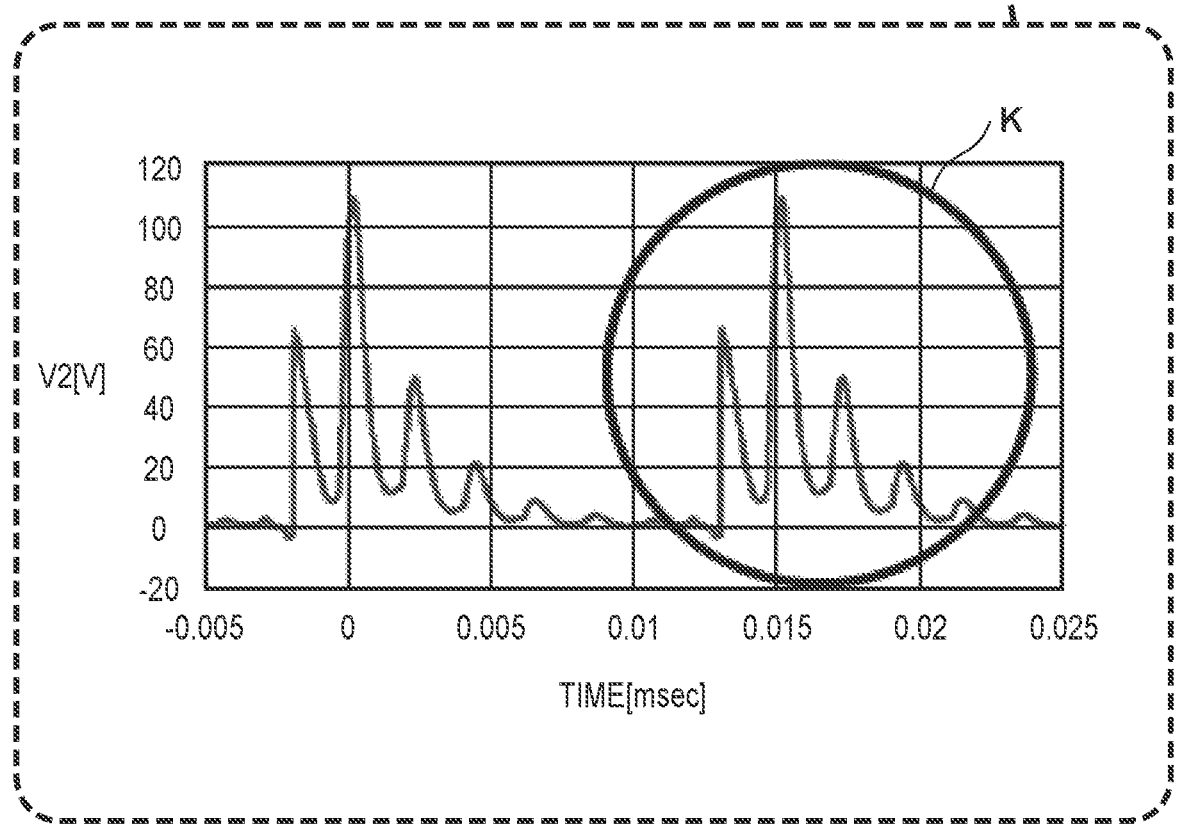

FIG. 5 is a diagram for describing an operation mode of the charge coil unit 123R as a comparison example. In the comparison example, the charge coil unit 123R includes the inductor L1 and the capacitor C1 mutually connected in parallel, and the rectifier element D1 connected to them in series.

In the circuit configuration of the comparison example, the current flowing into the capacitor C1 is in the opposite direction between the case where the induced voltage is generated in the direction indicated by "a" in the figure, and the case where the induced voltage is generated in the direction indicated by "b" in the figure. That is, in the case of the circuit configuration of the comparison example, charging and discharging of the capacitor C1 will be repeated alternately. Therefore, the voltage of the capacitor C1 remains approximately 0 [V]. Additionally, in the circuit configuration of the comparison example, since a closed loop path that allows a current to flow bidirectionally is formed by the inductor L1 and the capacitor C1, the so-called LC oscillation may occur. Therefore, as indicated by a portion K, an output voltage V2 of the charge coil unit 123R will show a plurality of pulsed waveforms with approximately 0 [V] as the reference point, for one period of the change in the magnetic field (one rotation of the flywheel 122).

Thus, according to the comparison example, it is difficult for the control unit 31 to control the switching unit 315 based on the output voltage V2, and to effectively perform charging of the battery 30. In addition, for the same reason, it is also difficult for the control unit 31 to perform detection of the number of rotations of the source of power 121, and other control using the detection result. Further, since the rectifier element D2 that can act as a protective element, such as a Zener diode, is not provided in the charge coil unit 123R, the output voltage V2 that has become an overvoltage may be applied to the output targets, such as the battery 30 and the control unit 31.

On the other hand, according to the present embodiment (FIG. 4A and the like), in the closed loop path formed by the inductor L1 and the capacitor C1, since the current in one direction will be allowed and the current in the other direction will be limited by the rectifier elements D1 and D2, the LC oscillation is appropriately regulated or suppressed.

Therefore, according to the present embodiment, the output voltage V1 of the charge coil unit 123 is stabilized, and shows a substantially single pulsed waveform with approximately 8 [V] as the reference point. Thus, according to the present embodiment, the control unit 31 can appropriately control the switching unit 315 based on the output voltage V2, and can effectively perform charging of the battery 30. In addition, according to the present embodiment, since the rectifier element D2 is provided such that its breakdown voltage becomes relatively low, and the output voltage V1 does not become an overvoltage, unexpected overvoltage is not applied to the output targets, such as the battery 30 and the control unit 31.

Additionally, in the present embodiment, the direction of the current at the time of charging of the capacitor C1 is determined in one direction, and the direction of the current at the time of discharging of the capacitor C1 is also determined in one direction. From another viewpoint, it can also be said that one terminal of the two terminals of the capacitor C1, in which charging and discharging are performed, is statically determined. Therefore, according to the present embodiment, a polarized capacitor such as an electrolytic capacitor, that is, an electronic component including two terminals, i.e., a positive terminal and a negative terminal, can be used for the capacitor C1. Therefore, compared with a case where a non-polarized capacitor such as a ceramic capacitor, that is, an electronic component with no distinction between a positive terminal and a negative terminal, is used, it may be possible to reduce the cost of the charge coil unit 123.

Additionally, in the present embodiment, a circuit configuration is used in which the inductor L1 is arranged on the low voltage side, and the capacitor C1 is arranged on the high voltage side. Therefore, the charging voltage of the capacitor C1 biases the output voltage V1, and here, the output voltage V1 is offset by approximately 8 [V] (refer to FIG. 4A and the like). Therefore, in a case where the battery is charged by using this output voltage V1, it becomes possible to accelerate the charging.

The circuit configuration that can stabilize the output voltage V1 is not limited to the above-described examples, and can be modified within a range that does not deviate from the spirit of the present invention. For example, in the circuit configuration exemplified in FIG. 4A, the circuit unit 1231 is provided to be able to charge the capacitor C1 by the induced current irrespective of the direction of the induced current generated in the inductor L1. However, the configuration of the circuit unit 1231 may be partially changed such that charging of the capacitor C1 is enabled when the induced current in one direction is generated in the inductor L1, and discharging of the capacitor C1 is limited when the induced current in the other direction is generated in the inductor L1.

Figure 6:
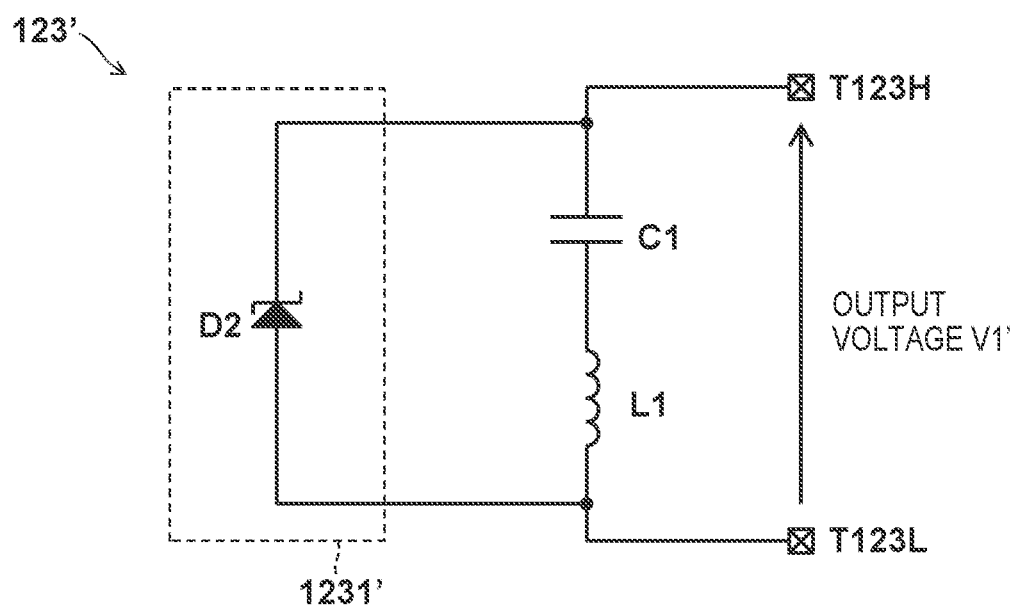
FIG. 6 is a diagram for describing another configuration example of the charge coil unit.

FIG. 6 shows a circuit configuration example of a charge coil unit 123' as another embodiment. The charge coil unit 123' includes a circuit unit 1231', instead of the circuit unit 1231. The circuit unit 1231' includes the rectifier element D2 connected in parallel to the inductor L1 and the capacitor C1 that are mutually connected in series, that is, the rectifier element D1 is omitted from the circuit configuration in FIG. 4A. According to such a circuit configuration, in the closed loop path formed by the inductor L1 and the capacitor C1, the current in one direction will be allowed, and the current in the other direction will be limited. Therefore, also in the charge coil unit 123' exemplified in FIG. 6, repeated charging and discharging of the capacitor C1 and the LC oscillation are regulated or suppressed, and accordingly, the output voltage V1' of the charge coil unit 123' can be stabilized.

According to the above embodiments, the charge coil unit 123 or 123' includes the inductor L1 and the capacitor C1 mutually connected in series, and the circuit unit 1231 or 1231'. The circuit unit 1231 or 1231' is provided to be able to charge the capacitor C1 by the induced current generated in the inductor L1. According to such a circuit configuration, the signal based on the power of the source of power 121 can be stably output as the output voltage V1. The power of the source of power 121 can be detected based on this output voltage V1, and in the present embodiment, since one rotation of the flywheel 122 corresponds to one pulse of the output voltage V1, the number of rotations of the source of power 121 can be appropriately detected.

Incidentally, in the present embodiment, the battery 30 and the control unit 31 are formed into the unit (that is, the battery 30 and the control unit 31 are integrally provided) to form the battery unit 3. Thus, according to the present embodiment, assembly of the battery unit 3 is simplified at the time of manufacturing of the work machine M, and it can be said that it is also advantageous for preparation of the battery unit 3.

On the other hand, since the frequency with which the work machine M is used is often varied through the season, and the user may not use the work machine M over a relatively long period of time, it is also conceivable that so-called battery down may occur. As a countermeasure against this battery down, it is also conceivable to remove the battery 30 from the work machine M in advance. However, attachment and detachment of the battery 30 are complicated for a user in many cases, and particularly, in the present embodiment, the battery 30 is formed into the unit with the control unit 31 as the battery unit 3. Therefore, this may also become the cause of increasing the user's burden. Additionally, in the configuration in FIG. 2, when the above-described battery down occurs, since the control unit 31 cannot receive electric power from the battery 30, the control unit 31 cannot start the power unit 12 via the starter 13. Thus, other element that can charge the battery 30 may be further provided in the control unit 31. This will be described in detail below with reference to FIG. 7 and FIG. 8.

Figure 7:
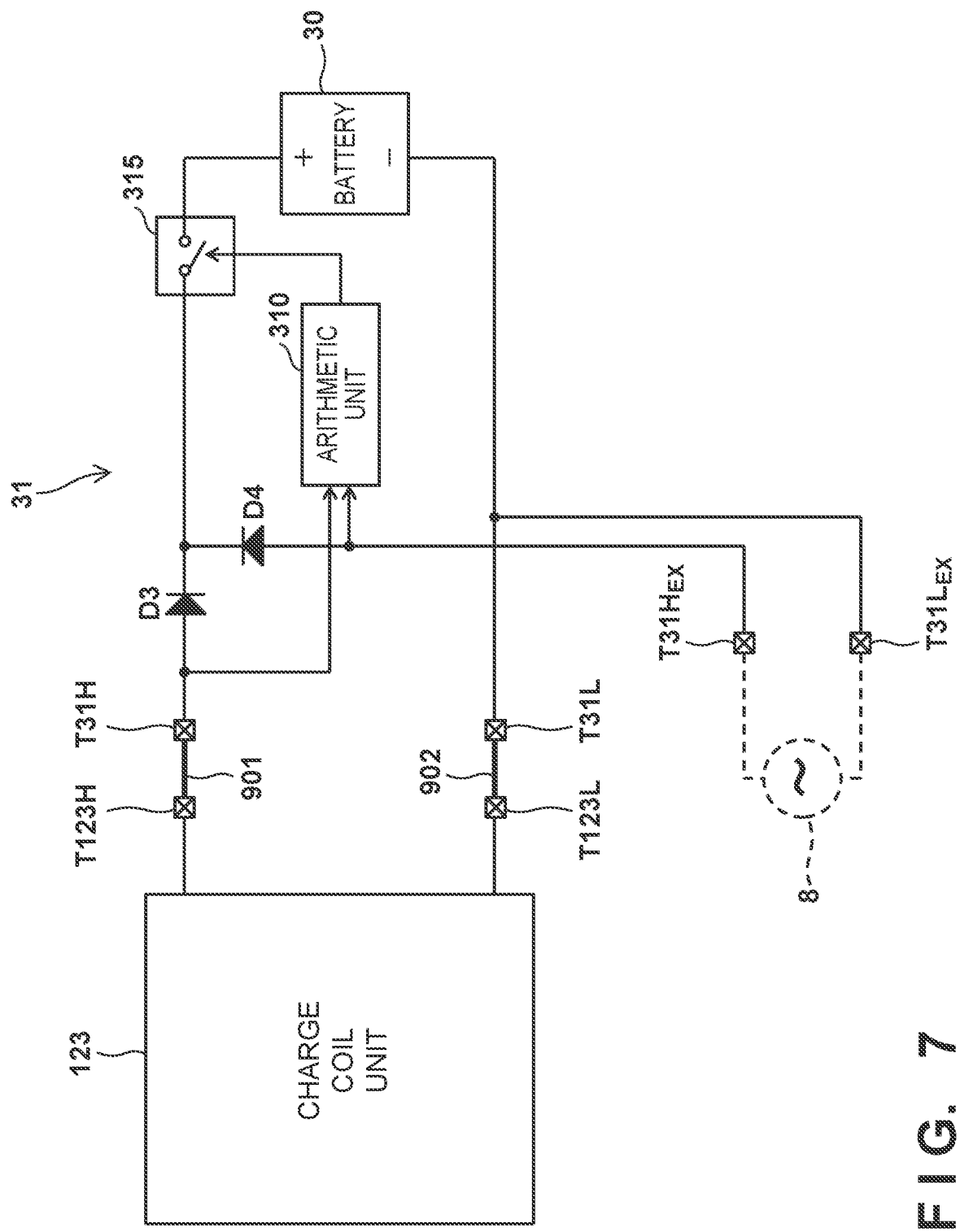
FIG. 7 is a diagram for describing a configuration example of a battery unit.

FIG. 7 shows, as a first example, the control unit 31 that is electrically connected to the charge coil unit 123, and that further includes other element that can charge the battery 30. Although a detailed configuration is not shown here, the charge coil unit 123 may be similarly configured as in FIG. 3. The control unit 31 further includes a connection terminal $T31H_{EX}$ on the high voltage side, and a connection terminal $T31L_{EX}$ on the low voltage side, as external electrodes for achieving electric connection to the external power supply 8. In addition, the control unit 31 further includes a rectifier element D4.

In the first example, the connection terminal $T31H_{EX}$ is connected to an electric path between the switching unit 315 and the rectifier element D3, and the arithmetic unit 310 can receive the voltage value or signal level of this connection terminal $T31H_{EX}$. In addition, the connection terminal $T31L_{EX}$ is connected to an electric path between the negative terminal of the battery 30 and the connection terminal T31L.

It is assumed that the external power supply 8 is a power source that is not electrically connected in normal time, and is externally added when necessary in emergency. Normal time here refers to a case where the work unit 1 can be operated, that is, a case where the above-described battery down has not occurred, and the concept of normal time includes working time and non-working time in which working can be started, and the other time is assumed to be emergency. A predetermined power source that can be connected to the above-described connection terminals $T31H_{EX}$ and $T31L_{EX}$, or that conforms to their standards may be used for the external power supply 8.

According to the first example, when the above-described battery down occurs, the external power supply 8 can be electrically connected to the above-described connection terminals T31HEX and $T31L_{EX}$. When the external power supply 8 is electrically connected, the arithmetic unit 310 detects that based on the voltage value or signal level of the connection terminal $T31H_{EX}$, and controls the switching unit 315 in response to the detection. In this manner, the control unit 31 can control the charging operation of the battery 30 using the external power supply 8.

Here, when the above-described external power supply 8 is electrically connected, the current toward the charge coil unit 123 from this external power supply 8, that is, the reverse current flow to the power unit 12 from the external power supply 8, is prevented by the rectifier element D3. Accordingly, the power unit 12, mainly the charge coil unit 123, can be protected, and both the battery 30 and the external power supply 8 can be protected from the unexpected output voltage of the charge coil unit 123 that can be generated when the above-described reverse current flow is generated.

In addition, the rectifier element D4 is arranged so as to prevent the reverse current flow from the charge coil unit 123 and the battery 30 to the external power supply 8 when the above-described external power supply 8 is electrically connected, and accordingly, the external power supply 8 can be protected.

According to the above-described the first example, the power unit 12 can be turned into the operation state in normal time, and the electric power from the power unit 12 (the output voltage from the charge coil unit 123) is input to the connection terminal T31H as the charging power of the battery 30. Additionally, in emergency, the external power supply 8 can be electrically connected, and the electric power from the electrically connected external power supply 8 is input to the connection terminal $T31H_{EX}$ as the charging power of the battery 30. The control unit 31 can receive these electric powers from the connection terminals T31H and $T31H_{EX}$, respectively, and can appropriately perform the charging operation of the battery 30 by using these electric powers. In addition, when the external power supply 8 is electrically connected, the power unit 12 can be protected, and along with this, the battery 30 and the external power supply 8 can also be protected.

As mentioned above, according to the first example, the control unit 31 functions as a control device for controlling the charging operation of the battery 30. The control unit 31 includes the connection terminals T31H and $T31H_{EX}$, and the rectifier element D3. The connection terminal T31H corresponds to the electrode that receives the electric power from the power unit 12 as the charging power of the battery 30. The connection terminal $T31H_{EX}$ is provided to be able to be electrically connected to the external power supply 8 in emergency, and corresponds to the electrode that can receive the electric power from the electrically connected external power supply 8 as the charging power of the battery 30. The rectifier element D3 is arranged in an electric path between both the battery 30 and the electrode $T31H_{EX}$ and the electrode T31H, allows passage of the electric power from the power unit 12 to the battery 30, and regulates passage of the electric power from the external power supply 8 to the power unit 12.

According to the above-described configuration, in normal time, the charging operation of the battery 30 based on the electric power from the power unit 12 is enabled, and in emergency, by electrically connecting the external power supply 8, the charging operation of the battery 30 based on the electric power of the external power supply 8 is enabled. Accordingly, the charging operation of the battery 30 can be appropriately controlled. In addition, according to the above-described configuration, when the external power supply 8 is electrically connected, the power unit 12 can be protected by preventing the reverse current flow from the external power supply 8 to the power unit 12, and along with this, the battery 30 and the external power supply 8 can be protected.

Figure 8:
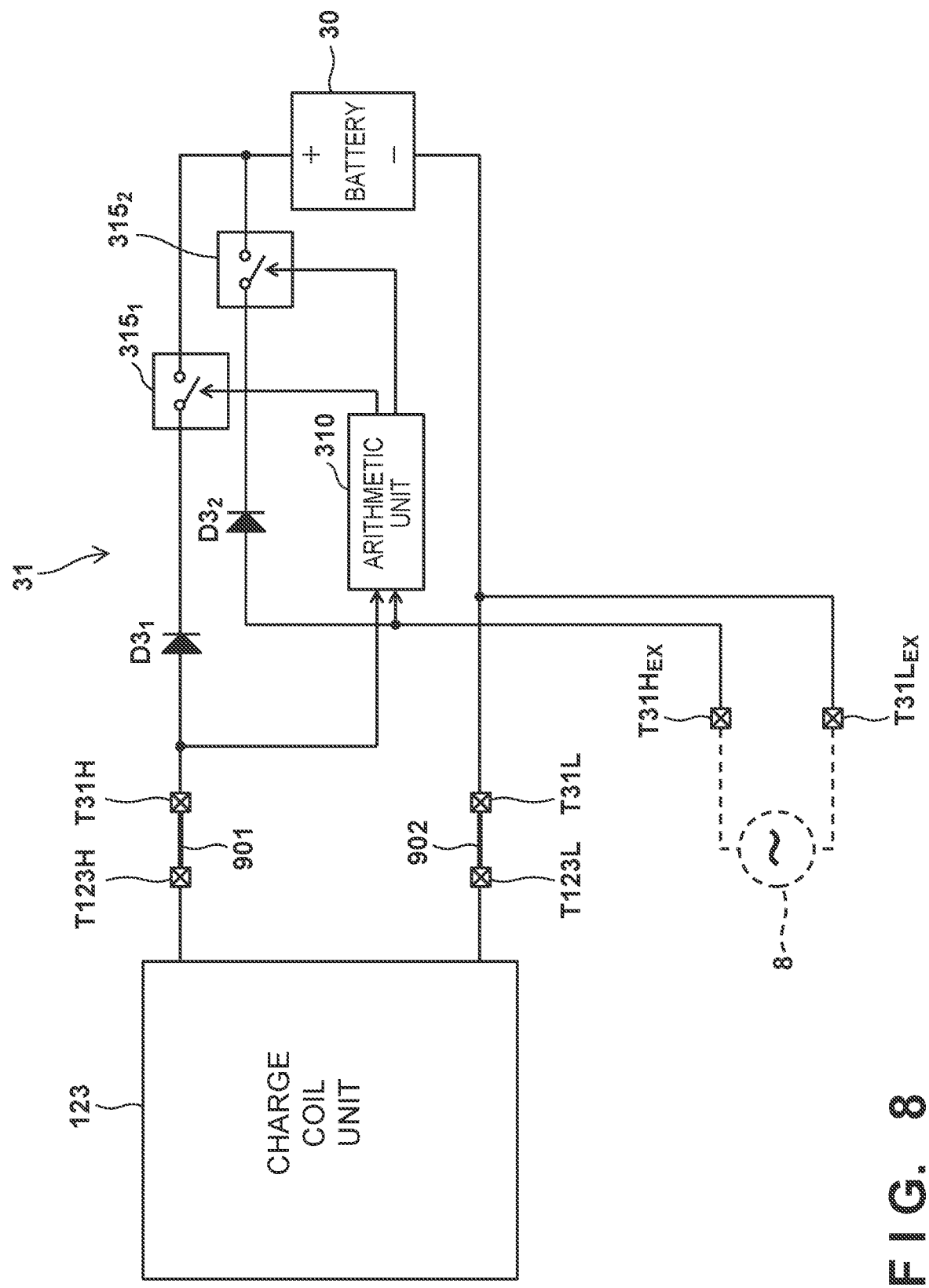
FIG. 8 is a diagram for describing a configuration example of the battery unit.

FIG. 8 shows, as a second example, the control unit 31 further including a yet another configuration that can charge the battery 30. The charge coil unit 123 may be similarly configured as in FIG. 3. In the second example, the control unit 31 further includes a second switching unit $315_2$ and a second rectifier element $D3_2$. For distinction, let the aforementioned switching unit 315 be "the first switching unit 3151", and let the aforementioned rectifier element D3 be "the first rectifier element D31." Note that the rectifier element D4 is omitted in the second example.

The switching unit $315_2$ and the rectifier element $D3_2$ are connected in series between the connection terminal $T31H_{EX}$ and the positive terminal of the battery 30. The switching unit $315_2$ is arranged on the positive terminal side of the battery 30, and the rectifier element $D3_2$ is arranged on a connection terminal $T31H_{EX}$ side. That is, the switching unit 3151 and the switching unit $315_2$ are mutually connected in parallel to the battery 30. Additionally, the rectifier element D31 is arranged in an electric path between the connection terminal T31H and the switching unit 3151, and the rectifier element $D3_2$ is arranged in an electric path between the connection terminal $T31H_{EX}$ and the switching unit $315_2$. When the external power supply 8 is electrically connected, the arithmetic unit 310 detects that based on the voltage value or signal level of the connection terminal $T31H_{EX}$, and controls the switching unit $315_2$ in response to the detection. In this manner, the control unit 31 can control the charging operation of the battery 30 using the external power supply 8.

Also by the above-described second example, as in the first example, the control unit 31 can appropriately perform the charging operation of the battery 30 by using the electric power from the power unit 12 and the electric power from the external power supply 8. In addition, since the arithmetic unit 310 can individually control the switching unit 3151 and the switching unit $315_2$ based on the voltage values or signal levels of the connection terminals T31H and $T31H_{EX}$, it becomes possible to make the configuration relatively simple. Thus, according to the above-described second example, the same effect as in the first example can be obtained, and it can also be said that it is advantageous for reducing the cost of the control unit 31.

The embodiments are summarized below:

A first aspect relates to a control device (for example, 31), and the control device is a control device for controlling a charging operation of a battery (for example, 30), and includes a first electrode (for example, T31H) that is electrically connected to a power unit (for example, 12), and that receives a first electric power from the power unit as charging power of the battery, a second electrode (for example, T31H$_{EX}$) that is provided to be able to be electrically connected to a predetermined power source (for example, 8), and that can receive a second electric power from the predetermined power source as the charging power of the battery, and a rectifier element (for example, D3, D3$_1$) that is arranged in an electric path between both the battery and the second electrode and the first electrode, so as to allow passage of the first electric power from the power unit to the battery, and to regulate passage of the second electric power from the predetermined power source electrically connected to the second electrode to the power unit.

According to the first aspect, the charging operation of the battery based on the above-described first to second electric powers can be appropriately controlled. In addition, when the predetermined power source is electrically connected, the power unit, the battery, and the external power supply can be protected by preventing the reverse current flow to the power unit, and it can also be said that it is advantageous for improving reliability.

In a second aspect, a switching unit (for example, 315) for switching between start and end of the charging operation and connected to the battery is further included, and the rectifier element is arranged in an electric path between the switching unit and the first electrode.

According to the second aspect, the above-described first aspect can be achieved with a relatively simple configuration.

In a third aspect, the rectifier element is a first rectifier element (for example, D3$_1$), and the control device further includes a first switching unit (for example, 315$_1$) for switching between start and end of the charging operation by the first electric power, a second switching unit (for example, 315$_2$) for switching between start and end of the charging operation by the second electric power, and a second rectifier element (for example, D3$_2$), the first switching unit and the second switching unit are mutually connected in parallel to the battery, the first rectifier element is arranged in an electric path between the first electrode and the first switching unit, and the second rectifier element is arranged in an electric path between the second electrode and the second switching unit.

According to the third aspect, the above-described first aspect can be achieved with a relatively simple configuration.

A fourth aspect relates to a battery unit (for example, 3), and the battery unit integrally includes the above-described control device (for example, 31) and the battery (for example, 30).

According to the fourth aspect, handling of the battery unit becomes easy by forming the above-described control device and battery into a unit.

A fifth aspect relates to a work machine (for example, M), and the work machine is a work machine including a work unit (for example, 1) for performing work, and includes the battery unit (for example, 3) described above and the power unit (for example, 12).

According to the fifth aspect, the above-described battery unit can be applied to a common work machine with the power unit.

In a sixth aspect, the power unit includes a source of power (for example, 121) for operating the work unit, a flywheel (for example, 122) that supports a magnet and that is arranged to be able to rotate according to the power of the source of power, and a charge coil unit (for example, 123) that is supported by the flywheel so as to be able to output a voltage based on the power of the source of power as the first electric power.

According to the sixth aspect, the battery in the above-described battery unit can be relatively simply charged.

In a seventh aspect, the charge coil unit includes an inductor (for example, L1) that generates an induced current based on the power of the source of power, a capacitor (for example, C1) connected in series to the inductor, and a circuit unit (for example, 1231) provided to be able to charge the capacitor by the induced current generated in the inductor.

According to the seventh aspect, the charge coil unit can stably output a signal based on the power of the source of power as the output voltage, and the battery in the above-described battery unit can be appropriately charged.

The present invention is not limited to the above embodiments and various changes and modifications can be made within the spirit and scope of the present invention. Therefore, to apprise the public of the scope of the present invention, the following claims are made.

The invention claimed is:

1. A work machine, comprising:
   a work mechanism configured to perform work;
   a battery unit, including a battery and a control device; and
   a power unit, including
      a source of power for operating the work mechanism,
      a flywheel that supports a magnet and that is arranged to be able to rotate according to a power of the source, and
      a charge coil unit that is supported by the flywheel so as to be able to output a voltage based on the power of the source as a first electric power,
   the charge coil unit includes:
      an inductor that generates an induced current based on the power of the source;
      a capacitor connected in series to the inductor; and
      a circuit unit provided to be able to charge the capacitor by the induced current generated in the inductor, and
   the control device includes:
      a first electrode that is electrically connected to the power unit, and that receives the first electric power from the power unit as charging power of the battery;
      a second electrode that is provided to be able to be electrically connected to a predetermined power source, and that can receive a second electric power from the predetermined power source as the charging power of the battery;
      a first rectifier element that is arranged in an electric path between the battery and the first electrode; and
      a second rectifier element that is arranged in an electric path between the battery and the second electrode, wherein
   the first rectifier element is configured to allow passage of the first electric power from the power unit to the battery, and to regulate passage of the second electric power from the predetermined power source electrically connected to the second electrode to the power unit, and
   the second rectifier element is configured to allow passage of the second electric power from the predetermined power source to the battery, and to regulate passage of the first electric power from the power unit electrically connected to the first electrode to the predetermined power source.

2. The work machine according to claim 1, further comprising:

the control device further includes a first switching unit for switching between start and end of a charging operation, wherein the first switching unit is connected to the battery, and the first rectifier element is arranged in an electric path between the first switching unit and the first electrode.

3. The work machine according to claim 2, wherein the control device further includes a second switching unit for switching between start and end of the charging operation by the second electric power, the first switching unit and the second switching unit are mutually connected in parallel to the battery, and the first rectifier element is arranged in an electric path between the first electrode and the first switching unit, and the second rectifier element is arranged in an electric path between the second electrode and the second switching unit.

4. The work machine according to claim 3, further comprising:
   a lever-type operator; and
   a button-type operator, wherein
   the work mechanism becomes in the operation state by operating the button-type operator while operating the lever-type operator.

5. The work machine according to claim 4, wherein the control device further includes:
   an arithmetic unit;
   a first circuit configured to detect an operation of the lever-type operator; and
   a second circuit configured to detect an operation of the button-type operator,
   wherein the arithmetic unit is configured to individually control the first switching unit and the second switching unit based on the first electric power and the second electric power.

6. The work machine according to claim 1, wherein the circuit unit includes:
   a third rectifier element connected in parallel to the capacitor; and
   a fourth rectifier element connected in parallel to both the inductor and the capacitor.

* * * * *